US011093755B2

(12) United States Patent
Miao et al.

(10) Patent No.: US 11,093,755 B2
(45) Date of Patent: Aug. 17, 2021

(54) VIDEO SEGMENTATION BASED ON WEIGHTED KNOWLEDGE GRAPH

(71) Applicant: International Business Machines Corporation, Armonk, NY (US)

(72) Inventors: Wan Wan Miao, Ningbo (CN); Kun Yan Yin, Ningbo (CN); Jian Gong Wang, Ningbo (CN); Yan Hu, Ningbo (CN); Lian Na Wang, Ningbo (CN)

(73) Assignee: International Business Machines Corporation, Armonk, NY (US)

(*) Notice: Subject to any disclaimer, the term of this patent is extended or adjusted under 35 U.S.C. 154(b) by 85 days.

(21) Appl. No.: 16/688,356

(22) Filed: Nov. 19, 2019

(65) Prior Publication Data

US 2021/0150224 A1    May 20, 2021

(51) Int. Cl.
*G06K 9/00* (2006.01)
*G06N 5/02* (2006.01)
*G06F 16/28* (2019.01)

(52) U.S. Cl.
CPC ....... *G06K 9/00765* (2013.01); *G06F 16/288* (2019.01); *G06K 9/00288* (2013.01);
(Continued)

(58) Field of Classification Search
CPC ........... G06K 9/00765; G06K 9/00288; G06K 9/00718; G06K 9/00744; G06F 16/288; G06N 5/02
See application file for complete search history.

(56) References Cited

U.S. PATENT DOCUMENTS

| 5,635,982 A | 6/1997 | Zhang et al. |
| 7,296,231 B2 | 11/2007 | Loui et al. |

(Continued)

FOREIGN PATENT DOCUMENTS

| CN | 101719144 A | 6/2010 |
| CN | 109168024 A | 1/2019 |
| CN | 109325148 A | 2/2019 |

OTHER PUBLICATIONS

Chen et al, "Knowledge-embedded routing network for scene graph generation", 2019, In Proceedings of the IEEE/CVF Conference on Computer Vision and Pattern Recognition, pp. 6163-6171 (9 pages) (Year: 2019).*

(Continued)

*Primary Examiner* — David F Dunphy
(74) *Attorney, Agent, or Firm* — Kelsey M. Skodje

(57) ABSTRACT

A system, method, and computer program product for segmenting videos. The system includes at least one processing component, at least one memory component, a video, an extraction component, and a graphing component. The extraction component is configured to extract image and text data from the video, identify entities in the image data, assign at least one entity relation to the entities in the image data, identifying entities in the text data, and assign at least one entity relation to the entities in the text data. The graphing component is configured to generate an image knowledge graph for the entity relations assigned to the entities in the image data, generate a text knowledge graph for the entity relations assigned to the at least two entities in the text data, and generate a weighted knowledge graph based on the image and text knowledge graphs.

20 Claims, 8 Drawing Sheets

(52) U.S. Cl.
CPC ..... *G06K 9/00718* (2013.01); *G06K 9/00744* (2013.01); *G06N 5/02* (2013.01)

(56) References Cited

U.S. PATENT DOCUMENTS

| | | |
|---|---|---|
| 7,765,574 B1 | 7/2010 | Maybury et al. |
| 7,949,050 B2 | 5/2011 | Xu et al. |
| 9,888,279 B2 | 2/2018 | Ishtiaq et al. |
| 2009/0010546 A1 | 1/2009 | Rossato et al. |
| 2013/0322765 A1 | 12/2013 | Neumann et al. |
| 2015/0057995 A1 | 2/2015 | Neumann et al. |
| 2015/0082349 A1* | 3/2015 | Ishtiaq ............... H04N 21/4884 725/40 |
| 2017/0091556 A1 | 3/2017 | Neumann et al. |

OTHER PUBLICATIONS

International Search Report and Written Opinion, International Application No. PCT/IB2020/059860, dated Jan. 27, 2021, 10 pgs.

Mocanu et al., "Automatic Extraction of Story Units from TV News," 2017 IEEE International Conference on Consumer Electronics (ICCE), 2017, 2 pages, IEEE.

Yeung et al., "Time-contrained Clustering for Segmentation of Video into Story Units," Proceedings of ICPR, 1996, pp. 375-380, IEE.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

VIDEO SEGMENTATION BASED ON WEIGHTED KNOWLEDGE GRAPH

BACKGROUND

The present disclosure relates to video segmentation and, more specifically, to segmenting a video based on relationships between entities identified in the video.

Videos include time-dependent image data (e.g., graphical images in video frames), usually accompanied by audio data (e.g., speech, music, and other noises). Text can accompany this data in forms such as captions, subtitles, text extracted from speech data via speech-to-text engines, scripts, transcripts, etc. Videos can be segmented into groups of frames based on content such as entities (e.g., specific people, animals, inanimate objects, etc.) and other features (e.g., topics of discussion, location/setting, language, music, etc.) extracted from image, audio, and/or text data. For example, a location in a film can be detected based on content characteristic of the location (e.g., language, scenery, etc.). Video frames depicting this setting can be grouped to form segments. This is typically carried out by video shot detection segmentation. However, this does not take into account scenarios in the video that occur in more than one shot or shots that include more than one scenario.

SUMMARY

Various embodiments are directed to a system that includes at least one processing component, at least one memory component, a video, an extraction component, and a graphing component. The extraction component is configured to extract image and text data from the video, identify entities in the image data, assign at least one entity relation to the entities in the image data, identifying entities in the text data, and assign at least one entity relation to the entities in the text data. The graphing component is configured to generate an image knowledge graph for the entity relations assigned to the entities in the image data, generate a text knowledge graph for the entity relations assigned to the at least two entities in the text data, and generate a weighted knowledge graph based on the image and text knowledge graphs. The weighted knowledge graph can include relation weights for the entity relations assigned to the entities in the image data and the text data. The video can be divided into pictures that each include a set of frames. The text data can be captions or extracted from speech data. The entities in the image data can be identified based on facial recognition. The system can also include a grouping component configured to identify a top relation in the entity relations, wherein the top relation is an entity relation having a relation weight greater than a threshold relation weight. The grouping component can also select frames of the video that correspond to the top relation, and group the frames into a video segment. Further, the grouping component can determine that there are remaining frames that do not include the top relation, determine that the frames in the video segment are nearest to the remaining frames, and group the remaining frames with the video segment.

Further embodiments are directed to a method that includes receiving a video, extracting image and text data from the video, and identifying entities in the image data and the text data. The method also includes assigning entity relations to the entities, generating an image knowledge graph for the entity relations assigned to the entities in the image data, and generating an image knowledge graph for the entity relations assigned to the entities in the text data. Further, the method includes generating a weighted knowledge graph based on the image knowledge graph and the text knowledge graph. The entities in the image data can be identified based on facial recognition. The weighted knowledge graph can include relation weights for the entity relations assigned to the entities in the image data and the text data. The text data can be captions, and the entities in the image data can be identified based on facial recognition. The video can be divided into pictures that each have a set of frames. The method can also include identifying a top relation in the entity relations, wherein the top relation is an entity relation having a relation weight greater than a threshold relation weight. Additionally, the method can include selecting frames of the video that correspond to the top relation, and grouping the frames into a video segment. The method can also include determining that there are remaining frames of the video that do not include the top relation, determining that the frames in the video segment are nearest to the remaining frames, and grouping the remaining frames with the video segment.

Additional embodiments are directed to a computer program product for segmenting videos. The computer program product includes a computer readable storage medium having program instructions embodied therewith, the program instructions executable by a processor to cause a device to perform a method that includes receiving a video, extracting image and text data from the video, and identifying entities in the image data and the text data. The method also includes assigning entity relations to the entities, generating an image knowledge graph for the entity relations assigned to the entities in the image data, and generating an image knowledge graph for the entity relations assigned to the entities in the text data. Further, the method includes generating a weighted knowledge graph based on the image knowledge graph and the text knowledge graph. The weighted knowledge graph can include relation weights for the entity relations assigned to the entities in the image data and the text data. The method can also include identifying a top relation in the entity relations, wherein the top relation is an entity relation having a relation weight greater than a threshold relation weight. Additionally, the method can include selecting frames of the video that correspond to the top relation, and grouping the frames into a video segment. The method can also include determining that there are remaining frames of the video that do not include the top relation, determining that the frames in the video segment are nearest to the remaining frames, and grouping the remaining frames with the video segment.

DETAILED DESCRIPTION

Video segmentation is a process of grouping video frames into related segments. This allows specific portions of a video to be located (e.g., in response to a user query). Videos can be temporally segmented based on shot transition detection. A video shot is a series of consecutive frames that are interrelated and represent continuous actions. Shot transitions can be detected based on visual or musical discontinuity, camera actions, etc. However, segmentation of videos based on shot transitions is frequently inaccurate when it comes to locating particular scenarios/stories within a video.

For example, shot transition techniques often fail when a scenario includes multiple shots or when a shot includes multiple scenarios. For example, an expense system training video can include scenarios describing how to register a user, how to attach a ticket, and how to input an expense. A user may wish to locate instructions for how to input an expense by searching for a segment that includes this scenario. However, current automatic segmentation techniques can exclude sections of the video related to this scenario if the segments include only consecutive frames and/or single shots. For example, there can be more than one non-consecutive set of frames in the video related to one of the scenarios. Therefore, when a user employs existing techniques to search for a scenario related to, e.g., attaching tickets in an expense system, frames of the video related to this scenario can be omitted from a segment generated for the scenario.

Disclosed herein is are techniques for segmenting videos into scenarios. The disclosed techniques include using weighted knowledge graphs to identify related pairs of entities within consecutive sets of frames divided at regular intervals (e.g., ten frames per set). These sets of frames are referred to herein as "pictures". The frames containing related entities are then grouped into segments. For example, there can be 100 frames of a video, and frames 51-53 and 61-70 can each include a pair of related entities, Person A and Person B. The pair of related entities is referred to herein as an "entity relation". In this example, the entity relation has a relation weight on the weighted knowledge graph that is greater than a threshold relation weight. Entity relations having weights greater than a threshold relation weight are referred to herein as "top relations". Because frames 51-53 and 61-70 include a top relation, these frames can be grouped into one video segment. Frames that include other top relations can be grouped into additional segments. Frames that include entity relations that are not top relations can be linked to segments having the nearest linked frames. For example, if an entity relation other than a top relation is included in frames 51-60, these frames can be linked to the aforementioned segment to form a segment that includes frames 51-70.

Figure 1:
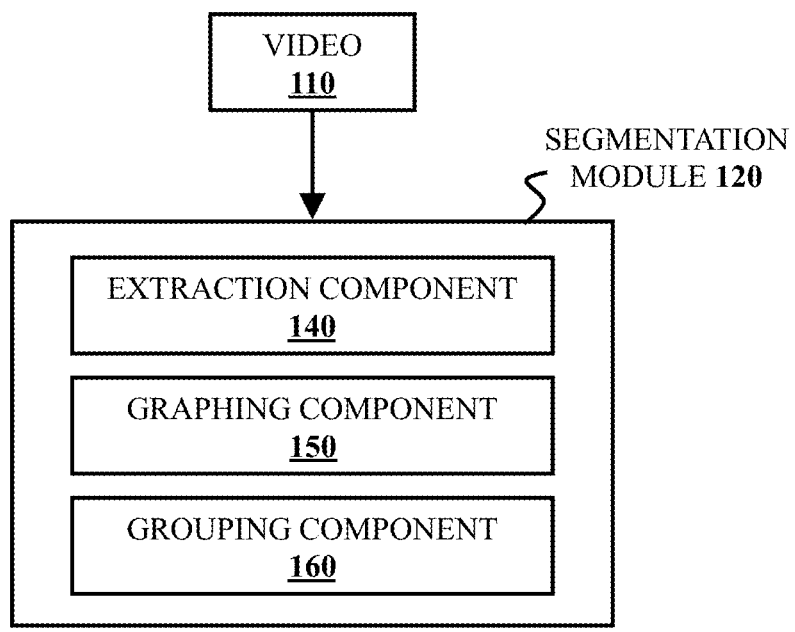
FIG. 1 is a block diagram illustrating a video segmentation environment, according to some embodiments of the present disclosure.

FIG. 1 is a block diagram illustrating a video segmentation environment 100, according to some embodiments of the present disclosure. The video segmentation environment 100 includes a video 110 and a segmentation module 120 for segmenting the video 110. The segmentation module 120 includes an extraction component 140, a graphing component 150, and a grouping component 160.

The video 110 can be encoded in accordance with any appropriate file format standard, such as Audio Video Interleave (AVI), Waveform Audio (WAV), Animation (ANI), Audio Interchange File Format (AIFF), Graphics Interchange Format (GIF), Motion Picture Experts Group (MPEG, e.g., MPEG-4), 8-Bit Sampled Voice (8SVX), etc. The video 110 includes frames, one or more of which depict entities such as people, animals, and/or inanimate objects. The video 110 also includes text data in the form of captions, subtitles, transcripts, computer-readable speech data, etc. The video 110 includes at least one set of consecutive frames, each set referred to herein as a "picture". This is discussed in greater detail below.

The extraction component 140 extracts entities and entity relations from the video's 110 image data. Entities can include particular people, animals, inanimate objects, etc. An entity relation is assigned to each pair of entities extracted from the same picture. The extraction component 140 can identify the entities using various image recognition techniques, such as region-based convolutional neural networks (R-CNN), scale-invariant feature transform (SIFT), real-time object detection techniques, pattern detection, edge/contour/ridge detection, histogram analysis, etc. There can also be one or more pictures that do not include entities. For example, entities can be identified based on facial recognition. In these instances, there would be no entities identified in pictures that only include features such as landscapes.

The extraction component 140 maps the entities to the pictures from which they were extracted. For example, the extraction component 140 can determine that a first picture ("picture 1") depicts a first person and a bird, a second picture ("picture 2") depicts a second person and the bird, and a third picture ("picture 3") includes the first person, the second person, and the bird. The following entity relations can then be established based on the image data: first person/bird (pictures 1 and 3), second person/bird (pictures 2 and 3), and first person/second person (picture 3).

The extraction component 140 also identifies entities and entity relations in text and/or audio (e.g., speech) data from the video 110. The extracted text can include captions or other text associated with the video (e.g., subtitles, transcripts, etc.). Speech data from extracted audio content can be converted into machine-encoded text by at least one speech-to-text engine (e.g., using techniques such as artificial neural networks, convolutional neural networks, statistical modeling, Hidden Markov Models (HMMs), lattice-based analysis, entropy-based speech segmentation algorithms, CMUSphinx, etc.). The extraction component 140 can also extract features from text obtained by converting characters (e.g., letters, numbers, punctuation, etc.) detected in video 110 frames to machine-encoded text using techniques such as optical character recognition (OCR) or intelligent character recognition (ICR). For example, the extraction component 140 can identify text printed on an object such as a building sign, book cover, etc.

Entities can be identified in the text in various ways. For example, the extraction component 140 can identify keywords such as character names. Further, text such as captions, scripts, etc. can identify which character (entity) is speaking each portion of the text. In some embodiments, entities can also be identified in speech audio data using text-independent and/or text-dependent speaker recognition techniques (e.g., frequency estimation, linear predictive coding (LPC), HMMs, Gaussian mixture models, pattern matching algorithms, neural networks, matrix representation, vector quantization, decision trees, etc.).

Further, the extraction component 140 maps the entities to video frames associated with the text from which they were extracted. The frames can be associated with text that is spoken to, by, or about particular entities. Returning to the previous example involving pictures 1-3 of the video 110, the video 110 can be divided into pictures at 10-frame intervals, and picture 3 can include frames 21-30. In this picture, frames 21-24 can include text spoken by the first person to the second person (e.g., "Hello"), and frames 27-29 can include a sentence about the bird that is spoken by the second person to the first person (e.g., "Look at the bird."). Based on the entities and associated frames, the extraction component 140 can identify the following entity relations: first person/second person (frames 21-24 and 27-29), first person/bird (frames 27-29), and second person/bird (frames 27-29).

Figure 3A:
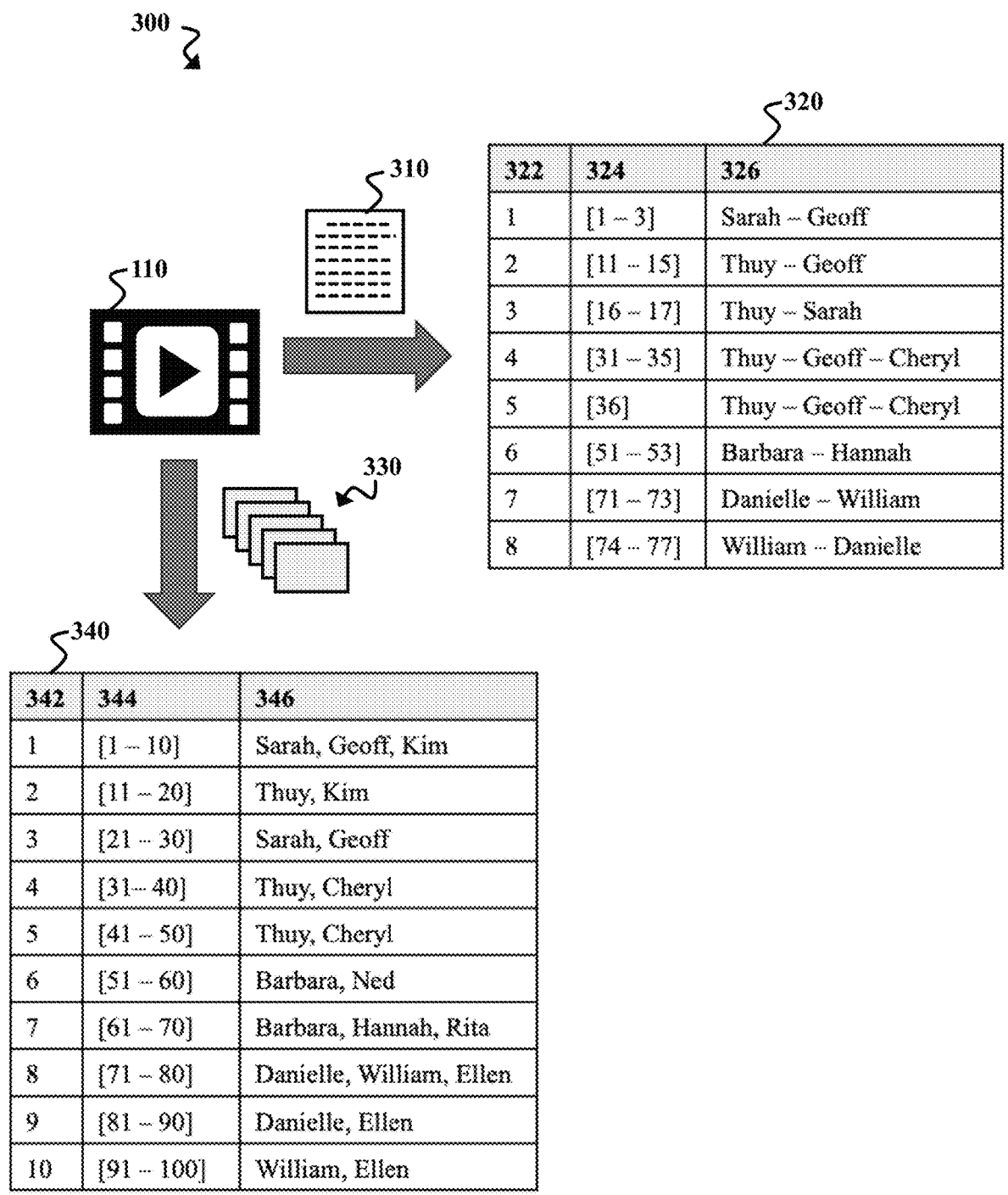
FIG. 3A is a schematic diagram illustrating a process of identifying entity relations in a video, according to some embodiments of the present disclosure.
Figure 3B:
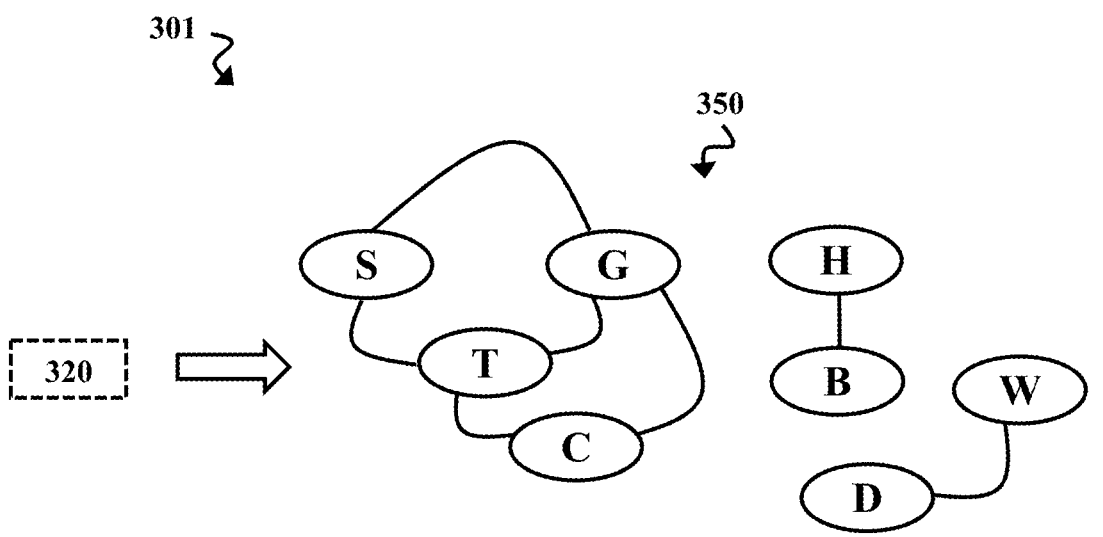
FIG. 3B is a schematic diagram illustrating a process of generating a text knowledge graph and an image knowledge graph, according to some embodiments of the present disclosure.
Figure 3B:
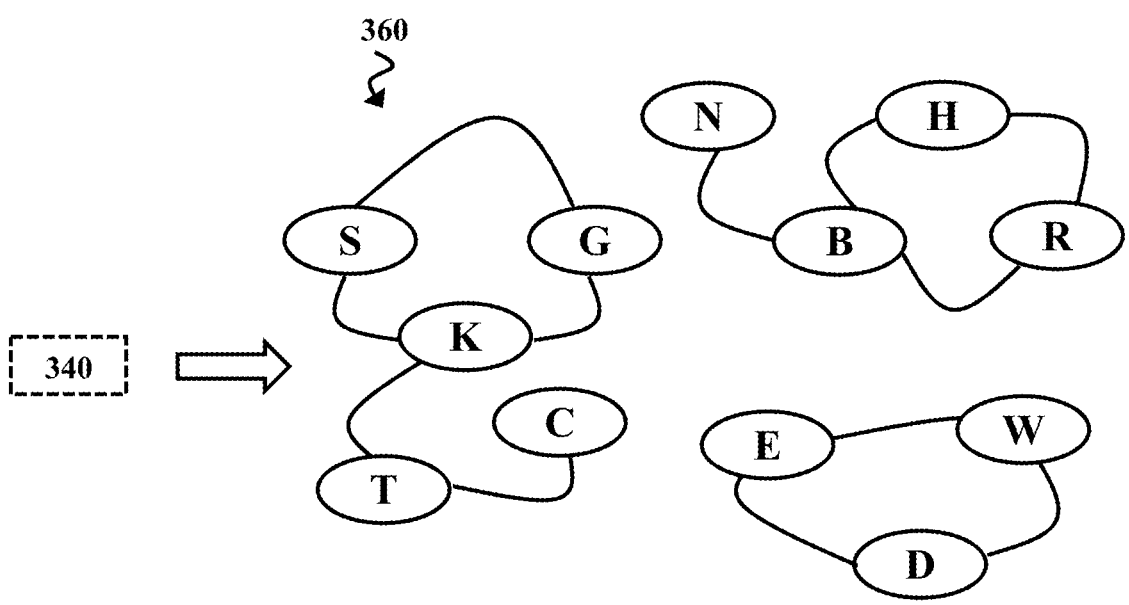
Figure 3C:
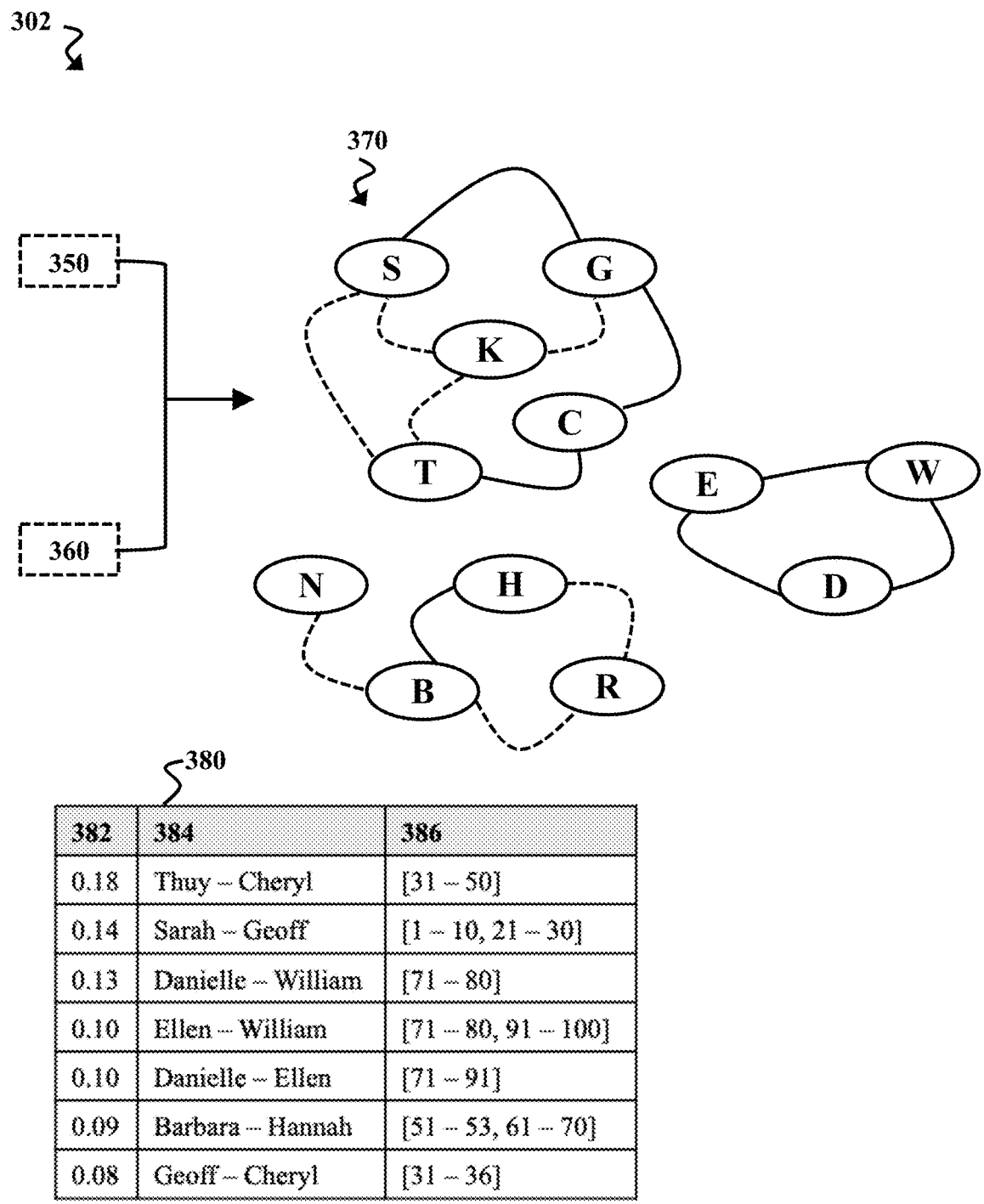
FIG. 3C is a schematic diagram illustrating a process of generating a weighted knowledge graph, according to some embodiments of the present disclosure.

The graphing component 150 generates image and text knowledge graphs based on the entities and entity relations identified in the extracted image and text data. The graphing component 150 also generates a weighted knowledge graph based on the image and text knowledge graphs. The weighted knowledge graph includes each entity relation for entities in the text and image data. The entity relations are weighted based on how often each relation occurs. Referring again to the previous example, the weight of the entity relation first person/bird can be raised relative to the other two relations because it occurs in two pictures (pictures 1 and 3). The weight of the entity relation first person/bird can be raised further because it occurs twice in picture 3 (frames 21-24 and 27-29). Examples of knowledge graphs are illustrated in FIGS. 3A-3C.

The grouping component 160 groups video frames into segments based on the weighted entity relations in the weighted knowledge graph. To do so, the grouping component 160 identifies top entity relations. Top entity relations are entity relations in the weighted knowledge graph having weights above a threshold relation weight value. The threshold value can be a preset or user input value. In some embodiments, the threshold can be adjusted based on desired segment size and/or selectivity. Frames corresponding to each entity relation having a relation weight above a threshold value are grouped together into segments. Frames corresponding only to remaining entity relations, which have relation weights falling below the threshold, are grouped with the nearest temporally linked frames. If there is more than one segment the same distance from a frame with a remaining entity relation, the frame can be grouped with the segment having top entity relations with the highest weight values. Examples of relation weight values and grouped segments are discussed in greater detail with respect to FIG. 3C.

Figure 2:
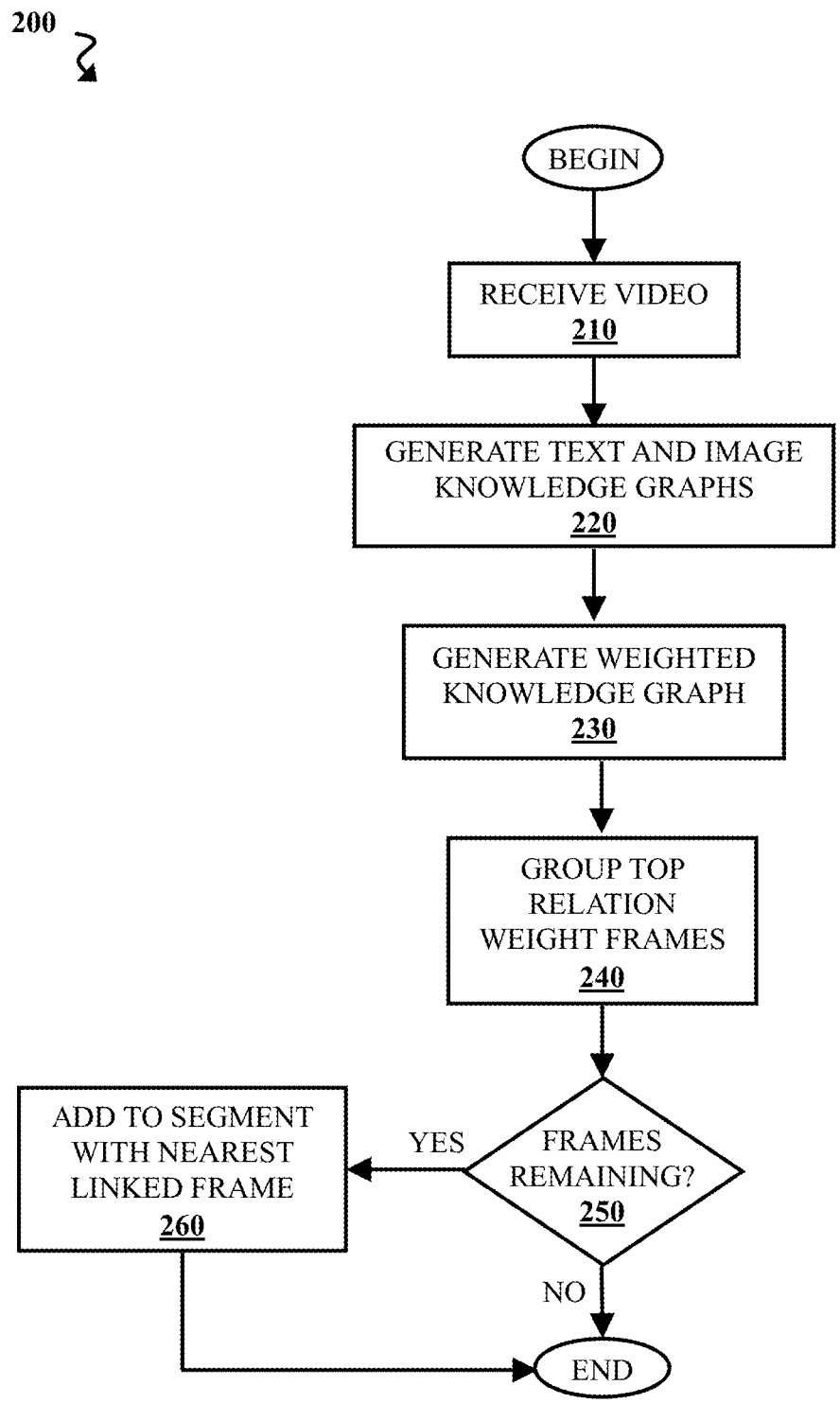
FIG. 2 is a flow diagram illustrating a process of segmenting a video, according to some embodiments of the present disclosure.

FIG. 2 is a flow diagram illustrating a process 200 of segmenting a video, according to some embodiments of the present disclosure. To illustrate process 200, but not to limit embodiments, FIG. 2 is described within the context of the video segmentation environment 100 of FIG. 1. Where elements shown in FIG. 2 are identical to elements shown in FIG. 1, the same reference numbers are used in both Figures.

Process 200 begins when a video 110 is received. This is illustrated at step 210. Video formats are discussed in greater detail with respect to FIG. 1. At least one frame of the video 110 depicts two or more entities (e.g., humans, animals, animated characters, etc.). Further, at least one of the frames is associated with text data that refers to at least two of the entities. In some embodiments, the text data is from captions, subtitles, scripts, etc. The text can also be from audio data such as recorded dialogue or narration. The video 110 is divided at regular intervals to form sets of frames referred to herein as "pictures". The number of frames in each picture can be preset and/or selected by a user. In some embodiments, there are 10 frames per picture, though the picture intervals can include any number of consecutive frames (e.g., 24 frames, 30 frames, 100 frames, 120 frames, 240 frames, 300 frames, 500 frames, 1,000 frames, etc.).

Text and image knowledge graphs are generated based on entities and entity relations identified in the video 110. This is illustrated at step 220. Entities and entity relations are identified in text and image data extracted from the video 110 by the extraction component 140. Extraction of data and identification of entities and entity relations are discussed in greater detail with respect to FIG. 1. Based on the entity relations, the graphing component 150 generates an image knowledge graph that links entities appearing in the same picture(s). Each picture can be assigned a picture number n, which can be an integer greater than zero (e.g., picture 1, picture 2, picture 3, etc.). Each linked pair of entities is referred to herein as an "entity relation". The image knowledge graph can also indicate the number of pictures in which each entity relation occurs. Generation of image knowledge graphs is discussed in greater detail with respect to FIGS. 1 and 3A.

The text knowledge graph includes entities and entity relations identified in the text data extracted by the extraction component 140. For example, an entity relation can be established in the text knowledge graph when text that includes a conversation between two entities is extracted from the video 110. The text knowledge graph can also indicate the number of occurrences of each entity relation identified in the text data, as well as which frames are associated with these occurrences. Generation of text knowledge graphs is discussed in greater detail with respect to FIGS. 1 and 3B.

A weighted knowledge graph is then generated. This is illustrated at step 230. The weighted knowledge graph is generated by the graphing component 150, and includes entity relations from both the image knowledge graph and the text knowledge graph. The graphing component 150 weights each entity relation based on the number of pictures in which it appears and/or its number of occurrences in the text data. Weighted knowledge graphs are discussed in greater detail with respect to FIGS. 1 and 3C.

Frames that include the top relations from the weighted knowledge graph are grouped into video segments. This is illustrated at step 240. The grouping component 160 identifies top relations in the weighted knowledge graph. The top relations are entity relations having relation weights greater that a threshold relation weight. Each video segment formed at step 240 includes frames in which at least one top relation has been identified. In the example discussed with respect to FIG. 1, wherein the video 110 has pictures 1, 2, and 3, a top relation can be first person/bird. Therefore, a segment can be generated for frames 21-24 and 27-29 because these frames include the first person/bird entity relation. Examples of grouping based on relation weights are discussed in greater detail with respect to FIGS. 1 and 3C.

When video segments have been generated for the top relations, it is determined whether there are frames remaining that have not been grouped into a segment. This is illustrated at step 250. If it is determined that there are no remaining frames, process 200 can end. However, if there are frames remaining, the remaining frames are added to the segments formed at step 240 that have the nearest frames. This is illustrated at step 260. The remaining frames are frames that include entity relations with relation weights below the relation weight threshold. The remaining frames do not include top relations. In an example of a video 110 that includes frames 1-90, a segment that includes frames 20-35 and frames 45-90 can be generated for top relations at step 240. At step 250, it can be determined that frames 36-44 are remaining frames. Then, at step 260, these frames can be added to the segment with frames 20-35 and 45-90 because it includes the nearest frames. If there are segments having frames the same distance from one or more remaining frames, the remaining frames can be grouped with the segment having an entity relation with the greater relation weight. When the remaining frames have each been added to video segments, process 200 ends.

FIGS. 3A-3C are schematic diagrams illustrating processes 300, 301, and 302 of generating knowledge graphs for video segmentation, according to some embodiments of the present disclosure. To illustrate processes 300-302, but not to limit embodiments, FIGS. 3A-3C are described within the context of the video segmentation environment 100 of FIG. 1 and the process 200 of FIG. 2. Where elements shown in FIGS. 3A-3C are identical to elements shown in FIGS. 1 and 2, the same reference numbers are used in each Figure.

FIG. 3A is a schematic diagram illustrating a process 300 of identifying entity relations in a video 110, according to some embodiments of the present disclosure. The extraction component 140 (FIG. 1) extracts text data 310 from the video 110, and identifies entities and entity relations in the data 310. The entities extracted from the text data 310 are illustrated in table 320, which includes columns 322, 324, and 326. Column 322 includes numbers (1-8) that each indicate an occurrence of at least one entity relation in the text data 310. The portions of the text 310 that include the occurrences are each associated with one or more video frames. The video frames corresponding to the occurrences in column 322 are identified by frame numbers in column 324. Column 326 includes the names of entities included in entity relations at each occurrence. Based on table 320, the entity relations extracted from the text data 310 include Sarah/Geoff (occurrence 1), Thuy/Geoff (occurrences 2, 4, and 5), Thuy/Sarah (occurrence 3), Thuy/Cheryl (occurrences 4 and 5), Cheryl/Geoff (occurrences 4 and 5), Barbara/Hannah (occurrence 6), and Danielle/William (occurrences 7 and 8).

The extraction component 140 also extracts image data 330 from the video 110. The entities and entity relations extracted from the image data 330 are illustrated in table 340, which includes columns 342, 344, and 346. Column 342 includes picture numbers 1-10, which each correspond to a set of ten consecutive frames of the video 110. Column 344 includes the numbers of the frames included in each picture. Column 346 includes the names of entities identified in each picture. Based on table 340, the entity relations identified in the image data 330 include Sarah/Geoff (pictures 1 and 3), Sarah/Kim (picture 1), Geoff/Kim (picture 1), Thuy/Kim (picture 2), Thuy/Cheryl (pictures 4 and 5), Barbara/Ned (picture 6), Barbara/Hannah (picture 7), Barbara/Rita (picture 7), Rita/Hannah (picture 7), Danielle/William (picture 8), Danielle/Ellen (pictures 8 and 9), and William/Ellen (pictures 8 and 10).

FIG. 3B is a schematic diagram illustrating a process 301 of generating a text knowledge graph 350 and an image knowledge graph 360, according to some embodiments of the present disclosure. Techniques that can be used to carry out process 301 are discussed in greater detail with respect to step 220 of process 200. The image and text knowledge graphs 350 and 360 are generated by the graphing component 150 (FIG. 1) based on the data from tables 320 and 340 (FIG. 3A), respectively. The nodes in each knowledge graph 350 and 360 represent entities, and the letters in the nodes are the first initials of the entities listed in table 320 (column 326) and table 340 (column 346), respectively.

The lines in each knowledge graph 350 and 360 represent entity relations. Information from table 320 such as numbers of occurrences and corresponding frames can be associated with the lines in the text knowledge graph 350. For example, the line representing the Sarah/Geoff (S/G) entity relation can be linked to information indicating that there is one occurrence of the S/G entity relation, and that the occurrence is in frames 1-3. Further, the picture numbers (column 342) and corresponding frames (column 344) in table 340 can be associated with the lines in the image knowledge graph 360. For example, the S/G entity relation can be linked to information indicating that Sarah and Geoff both appear in pictures 1 and 3, which correspond to frames 1-10 and 21-30. Techniques that can be used to carry out processes 300 and 301 are discussed in greater detail with respect to steps 210 and 220 of process 200.

FIG. 3C is a schematic diagram illustrating a process 302 of generating a weighted knowledge graph 370, according to some embodiments of the present disclosure. The weighted knowledge graph 370 includes solid lines representing top relations, and dashed lines representing remaining entity relations. Techniques that can be used to carry out process 302 are discussed in greater detail with respect to steps 230-260 of process 200. The weighted knowledge graph 370 is generated by the graphing component 150, which calculates unions of the sets of entities and entity relations in the text knowledge graph 350 and image knowledge graph 360 (FIG. 3B). This can be represented by the following equations:

$$\{Entities_{Weighted\ KG}\} = \{Entities_{Text\ KG}\} \cup \{Entities_{Image\ KG}\}$$

$$\{Relations_{Weighted\ KG}\} = \{Relations_{Text\ KG}\} \cup \{Relations_{Image\ KG}\}$$

where "KG" stands for "knowledge graph".

The graphing component 150 determines the relation weight of each entity relation based on the number of times the entity relation occurs in the text and image knowledge graphs 350 and 360. For example, a relation weight for an entity relation can be calculated using the following equation:

$$Weight_r = \frac{iWeight_r}{total\ images} * \sigma_p + \frac{tWeight_r}{\sum_{i=0}^{n} tWeight_r} * (1 - \sigma_p)$$

where $Weight_r$ is the relation weight, $iWeight_r$ is the occurrence count of the entity relation in the image knowledge graph 360, $tWeight_r$ is the occurrence count of the entity relation in the text knowledge graph 350, and $\sigma_p$ is the influence factor of the image knowledge graph 360 to the weighted knowledge graph 370. Table 380 includes the top relation weights (column 382) calculated for entity relations (column 384) in the weighted knowledge graph 370, as well as the video frames containing each entity relation (column 386). The remaining entity relations, which have Weight$_r$ values below a threshold value (e.g., Weight$_r$=0.05), are not shown in table 380.

The frames (column 386) corresponding to the top relations in table 380 are grouped into video segments by the grouping component 160 (FIG. 1). In the example illustrated in FIG. 3C, the video 110 (FIGS. 1 and 3A) can be divided into three segments. The first segment can include frames 1-10 and 21-50, which include top relation entities Thuy, Cheryl, Geoff, and Sarah (nodes T, C, S, and G). The second segment can include frames 51-53 and 61-70, which include top relation entities Barbara and Hannah (nodes B and H). The third video segment can include frames 71-100, which include top relation entities Danielle, William, and Ellen (nodes D, W, and E).

When the frames having top relations are grouped together, the grouping component 160 can determine that frames 11-20 and 51-60 remain, and have not be linked to a segment. The remaining frames are then linked to segments having the nearest frames. Frames 11-20 are closest to frames 1-10 and 21-50, and can therefore be linked to the first segment. Further, frames 51 60 are closest to frames 51-53 and 61-70, and are therefore linked to the second segment. When each of the frames has been grouped, the first segment includes frames 1-50, the second segment includes frames 51-70, and the third segment includes frames 71-100.

Figure 4:
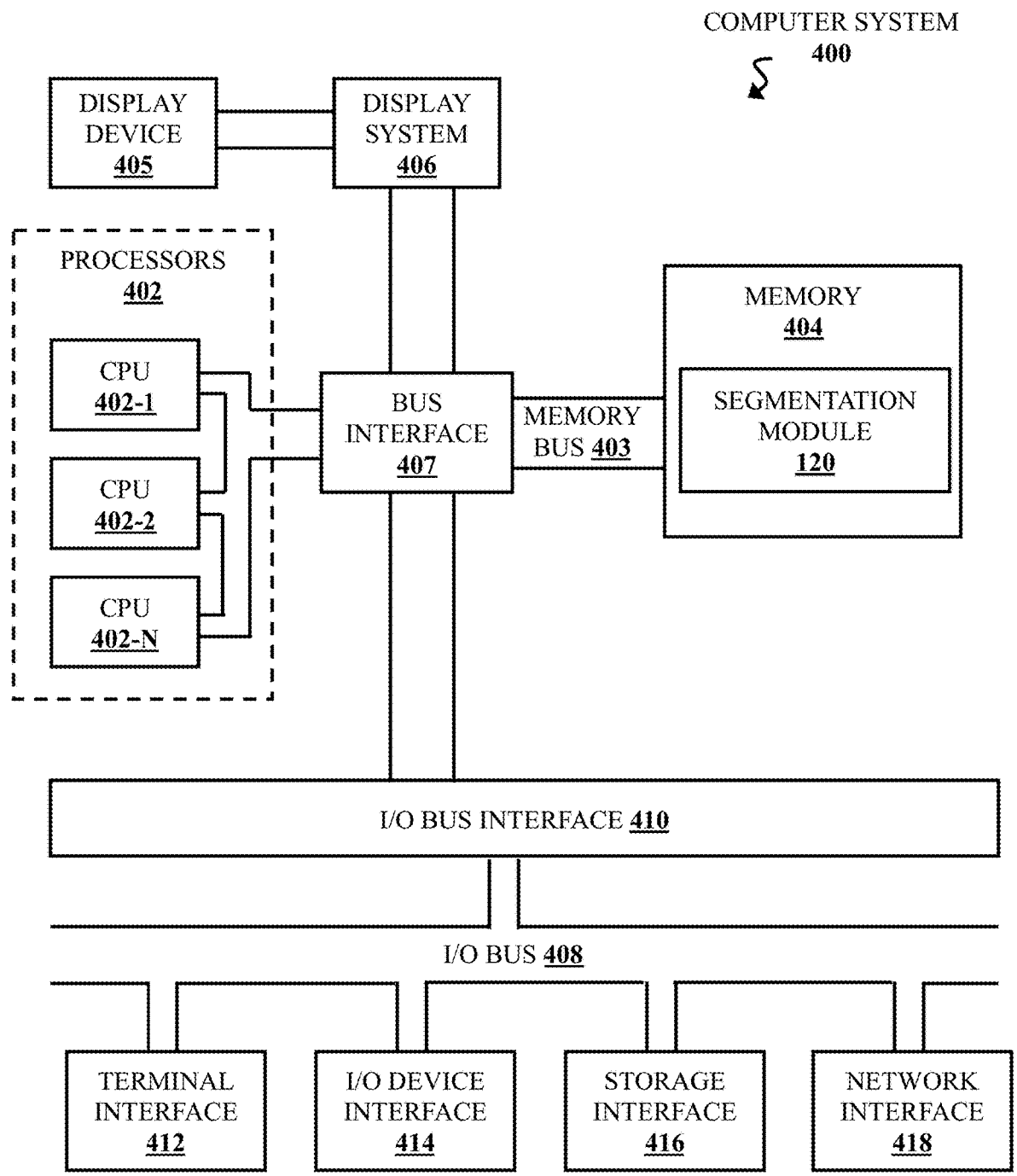
FIG. 4 is a block diagram illustrating a computer system, according to some embodiments of the present disclosure.

FIG. 4 is a block diagram illustrating an exemplary computer system 400 that can be used in implementing one or more of the methods, tools, components, and any related functions described herein (e.g., using one or more processor circuits or computer processors of the computer). In some embodiments, the major components of the computer system 400 comprise one or more processors 402, a memory subsystem 404, a terminal interface 412, a storage interface 416, an input/output device interface 414, and a network interface 418, all of which can be communicatively coupled, directly or indirectly, for inter-component communication via a memory bus 403, an input/output bus 408, bus interface unit 407, and an input/output bus interface unit 410.

The computer system 400 contains one or more general-purpose programmable central processing units (CPUs) 402-1, 402-2, and 402-N, herein collectively referred to as the CPU 402. In some embodiments, the computer system 400 contains multiple processors typical of a relatively large system; however, in other embodiments the computer system 400 can alternatively be a single CPU system. Each CPU 402 may execute instructions stored in the memory subsystem 404 and can include one or more levels of on-board cache.

The memory 404 can include a random-access semiconductor memory, storage device, or storage medium (either volatile or non-volatile) for storing or encoding data and programs. In some embodiments, the memory 404 represents the entire virtual memory of the computer system 400, and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

These components are illustrated as being included within the memory 404 in the computer system 400. However, in other embodiments, some or all of these components may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, though the segmentation module 120 is illustrated as being included within the memory 404, components of the memory 404 are not necessarily all completely contained in the same storage device at the same time. Further, although these components are illustrated as being separate entities, in other embodiments some of these components, portions of some of these components, or all of these components may be packaged together.

In an embodiment, the segmentation module 120 includes instructions that execute on the processor 402 or instructions that are interpreted by instructions that execute on the processor 402 to carry out the functions as further described in this disclosure. In another embodiment, the segmentation module 120 is implemented in hardware via semiconductor devices, chips, logical gates, circuits, circuit cards, and/or other physical hardware devices in lieu of, or in addition to, a processor-based system. In another embodiment, the segmentation module 120 includes data in addition to instructions.

Although the memory bus 403 is shown in FIG. 4 as a single bus structure providing a direct communication path among the CPUs 402, the memory subsystem 404, the display system 406, the bus interface 407, and the input/output bus interface 410, the memory bus 403 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 410 and the input/output bus 408 are shown as single respective units, the computer system 400 may, in some embodiments, contain multiple input/output bus interface units 410, multiple input/output buses 408, or both. Further, while multiple input/output interface units are shown, which separate the input/output bus 408 from various communications paths running to the various input/output devices, in other embodiments some or all of the input/output devices may be connected directly to one or more system input/output buses.

The computer system 400 may include a bus interface unit 407 to handle communications among the processor 402, the memory 404, a display system 406, and the input/output bus interface unit 410. The input/output bus interface unit 410 may be coupled with the input/output bus 408 for transferring data to and from the various input/output units. The input/output bus interface unit 410 communicates with multiple input/output interface units 412, 414, 416, and 418, which are also known as input/output processors (IOPs) or input/output adapters (IOAs), through the input/output bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 is a multi-user mainframe computer system, a single-user system, or a server computer or similar device that has little or no direct user interface, but receives requests from other computer systems (clients). Further, in some embodiments, the computer system 400 is implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, Components other than or in addition to those shown in FIG. 4 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
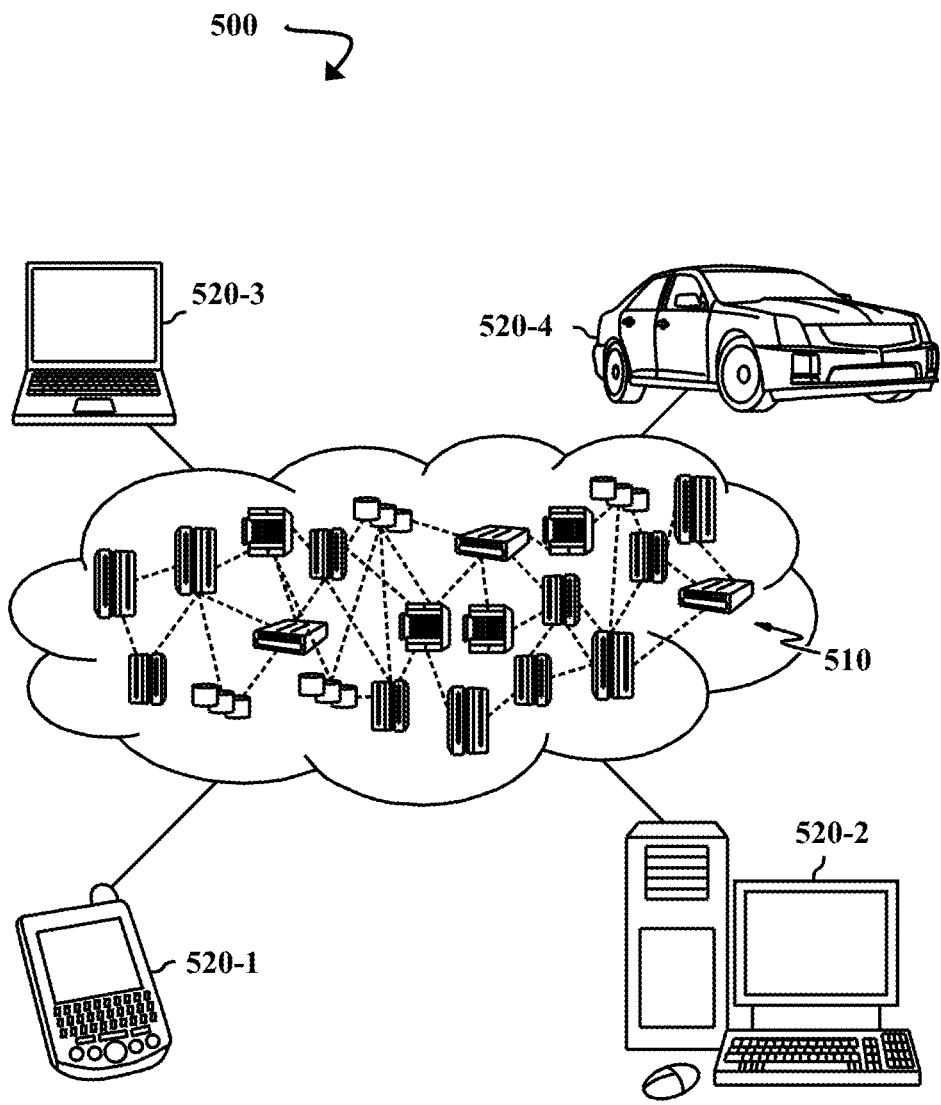
FIG. 5 is a block diagram illustrating a cloud computing environment, according to some embodiments of the present disclosure.

FIG. 5 is a block diagram illustrating a cloud computing environment 500, according to some embodiments of the present disclosure. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1-520-4 shown in FIG. 6 are intended to be illustrative only and that computing nodes 510 and cloud computing environment 500 can communicate with any type of computerized device over any type of network and/or network addressable connection (e.g., using a web browser).

Figure 6:
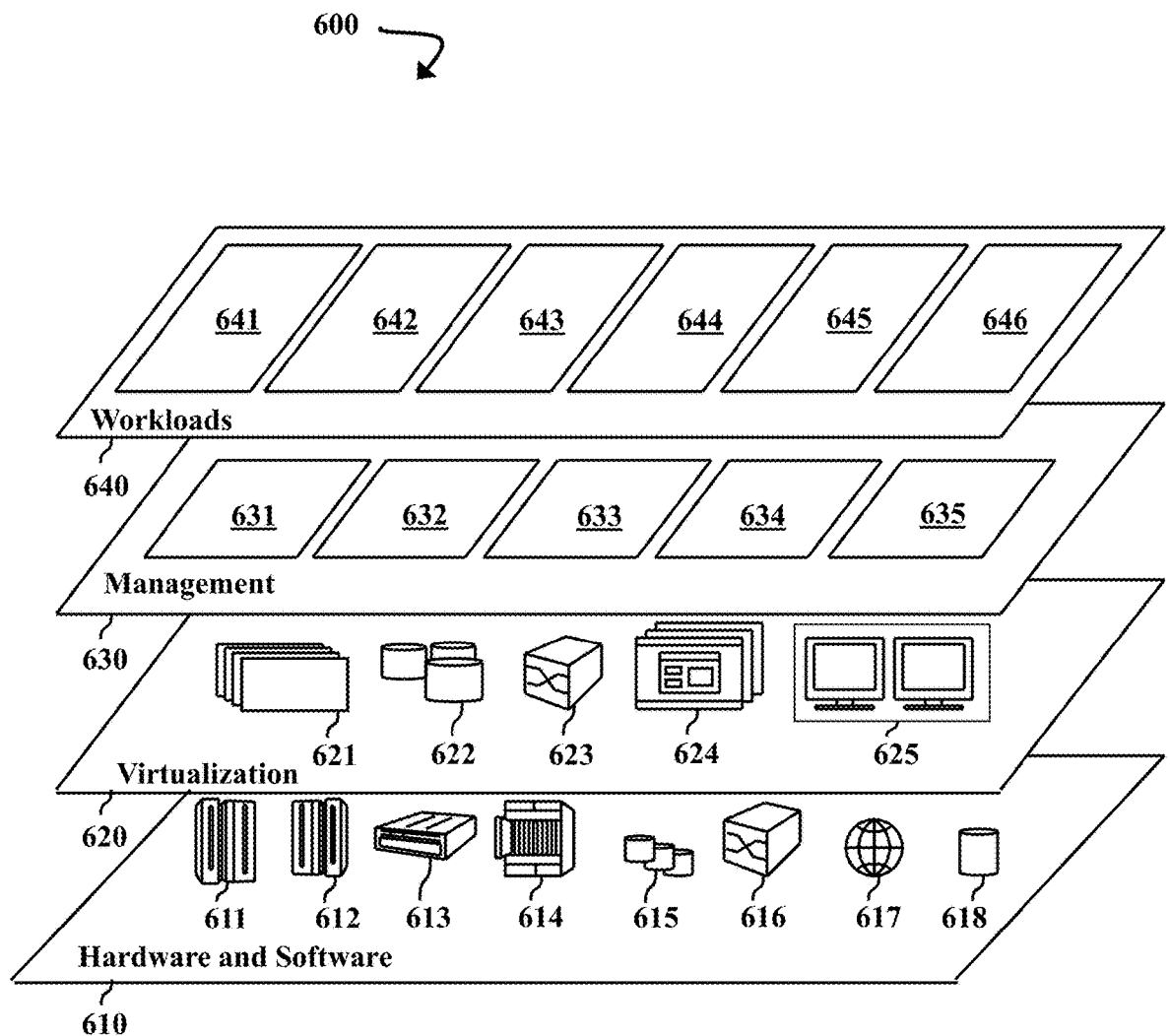
FIG. 6 is a block diagram illustrating a set of functional abstraction model layers provided by the cloud computing environment, according to some embodiments of the present disclosure.

FIG. 6 is a block diagram illustrating a set of functional abstraction model layers 600 provided by the cloud computing environment 500, according to some embodiments of the present disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 provides the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment can be utilized. Examples of workloads and functions that can be provided from this layer include: mapping and navigation 641; software development and lifecycle management 652; virtual classroom education delivery 643; data analytics processing 644; transaction processing 645; and segmenting videos based on weighted knowledge graphs 646.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system for segmenting videos, comprising:
   at least one processing component;
   at least one memory component;
   a video;
   an extraction component configured to:
      extract image data and text data from the video;
      identify at least two entities in the image data;
      assign at least one entity relation to the at least two entities in the image data;
      identify at least two entities in the text data; and
      assign at least one entity relation to the two or more entities in the text data; and
   a graphing component configured to:
      generate an image knowledge graph for the at least one entity relation assigned to the at least two entities in the image data;
      generate a text knowledge graph for the at least one entity relation assigned to the at least two entities in the text data; and
      generate a weighted knowledge graph based on the image knowledge graph and the text knowledge graph.

2. The system of claim 1, wherein the weighted knowledge graph includes relation weights for the at least one entity relation assigned to the at least two entities in the image data and the at least one entity relation assigned to the at least two entities in the text data.

3. The system of claim 2, further comprising a grouping component configured to:
   identify a top relation in the at least one entity relation assigned to the at least two entities in the image data and the at least one entity relation assigned to the at least two entities in the text data, wherein the top relation is an entity relation having a relation weight greater than a threshold relation weight;
   select frames of the video that correspond to the top relation; and
   group the frames into a video segment.

4. The system of claim 3, wherein the grouping component is further configured to:
   determine that there are remaining frames of the video that do not include the top relation;
   determine that the frames in the video segment are nearest to the remaining frames; and
   group the remaining frames with the video segment.

5. The system of claim 1, wherein the video is divided into pictures, wherein each picture includes a set of frames.

6. The system of claim 1, wherein the text data is captions.

7. The system of claim 1, wherein the text data is extracted from speech data.

8. The system of claim 1, wherein the at least two entities in the image data are identified based on facial recognition.

9. A method, comprising:
   receiving a video;
   extracting image data and text data from the video;
   identifying at least two entities in the image data;
   assigning at least one entity relation to the at least two entities in the image data;
   identifying at least two entities in the text data;

assigning at least one entity relation to the at least two entities in the text data;

generating an image knowledge graph for the at least one entity relation assigned to the at least two entities in the image data;

generating a text knowledge graph for the at least one entity relation assigned to the at least two entities in the text data; and generating a weighted knowledge graph based on the image knowledge graph and the text knowledge graph.

10. The method of claim 9, wherein the weighted knowledge graph includes relation weights for the at least one entity relation assigned to the at least two entities in the image data and the at least one entity relation assigned to the at least two entities in the text data.

11. The method of claim 10, further comprising:

identifying a top relation in the at least one entity relation assigned to the at least two entities in the image data and the at least one entity relation assigned to the at least two entities in the text data, wherein the top relation is an entity relation having a relation weight greater than a threshold relation weight;

selecting frames of the video that correspond to the top relation; and grouping the frames into a video segment.

12. The method of claim 11, further comprising:

determining that there are remaining frames of the video that do not include the top relation;

determining that the frames in the video segment are nearest to the remaining frames; and grouping the remaining frames with the video segment.

13. The method of claim 9, wherein the video is divided into pictures, wherein each picture includes a set of frames.

14. The method of claim 9, wherein the text data is captions.

15. The method of claim 9, wherein the at least two entities in the image data are identified based on facial recognition.

16. A computer program product for segmenting videos, the computer program product comprising a computer readable storage medium having program instructions embodied therewith, the program instructions executable by a processor to cause a device to perform a method, the method comprising:

receiving a video;

extracting image data and text data from the video;

identifying at least two entities in the image data;

assigning at least one entity relation to the at least two entities in the image data;

identifying at least two entities in the text data;

assigning at least one entity relation to the at least two entities in the text data;

generating an image knowledge graph for the at least one entity relation assigned to the at least two entities in the image data;

generating a text knowledge graph for the at least one entity relation assigned to the at least two entities in the text data; and generating a weighted knowledge graph based on the image knowledge graph and the text knowledge graph.

17. The computer program product of claim 16, wherein the weighted knowledge graph includes relation weights for the at least one entity relation assigned to the at least two entities in the image data and the at least one entity relation assigned to the at least two entities in the text data.

18. The computer program product of claim 17, further comprising:

identifying a top relation in the at least one entity relation assigned to the at least two entities in the image data and the at least one entity relation assigned to the at least two entities in the text data, wherein the top relation is an entity relation having a relation weight greater than a threshold relation weight;

selecting frames of the video that correspond to the top relation; and grouping the frames into a video segment.

19. The computer program product of claim 18, further comprising:

determining that there are remaining frames of the video that do not include the top relation;

determining that the frames in the video segment are nearest to the remaining frames; and grouping the remaining frames with the video segment.

20. The computer program product of claim 16, wherein the at least two entities in the image data are identified based on facial recognition.

* * * * *